(12) United States Patent  (10) Patent No.: US 8,963,398 B2
Roman et al.                  (45) Date of Patent:     Feb. 24, 2015

(54) CURRENT CONTROL BRUSH ASSEMBLY (75) Inventors: Matthew D. Roman, Rockport, ME (US); Jason Richardson, Hebron, ME (US); Jeffrey W. Richardson, Otisfield, ME (US); Adam Willwerth, Yarmouth, ME (US)

(73) Assignee: Illinois Tool Works Inc., Glenview, IL (US)

( * ) Notice: Subject to any disclaimer, the term of this patent is extended or adjusted under 35 U.S.C. 154(b) by 249 days.

(21) Appl. No.: 13/601,549

(22) Filed: Aug. 31, 2012

(65) Prior Publication Data

US 2013/0106236 A1    May 2, 2013

Related U.S. Application Data (60) Provisional application No. 61/552,859, filed on Oct. 28, 2011.

(51) Int. Cl.
  *H02K 13/00*    (2006.01)
  *H02K 11/00*    (2006.01)

(52) U.S. Cl.
  CPC .................................. *H02K 11/0089* (2013.01)
  USPC ............................ 310/239; 310/219; 310/225

(58) Field of Classification Search
  USPC .................................. 310/219–225, 239–251
  See application file for complete search history.

(56) References Cited

U.S. PATENT DOCUMENTS

| | | | |
|---|---|---|---|
| 5,804,903 A * | 9/1998 | Fisher et al. | 310/248 |
| 7,136,271 B2 | 11/2006 | Oh | |
| 7,193,836 B2 | 3/2007 | Oh | |
| 7,521,827 B2 * | 4/2009 | Orlowski et al. | 310/68 R |
| 7,528,513 B2 * | 5/2009 | Oh | 310/88 |
| 8,189,317 B2 * | 5/2012 | Oh et al. | 361/221 |
| 8,293,080 B2 * | 10/2012 | Barnard et al. | 204/297.01 |
| 8,432,659 B2 | 4/2013 | Oh | |
| 2004/0056543 A1 * | 3/2004 | Melfi | 310/68 R |
| 2007/0040459 A1 * | 2/2007 | Oh | 310/68 C |
| 2007/0159763 A1 * | 7/2007 | Barnard et al. | 361/212 |
| 2008/0258576 A1 * | 10/2008 | Oh et al. | 310/249 |
| 2010/0001602 A1 * | 1/2010 | Bossaller et al. | 310/89 |
| 2013/0005158 A1 * | 1/2013 | Richardson et al. | 439/27 |

FOREIGN PATENT DOCUMENTS

| | | |
|---|---|---|
| DE | 1132231 | 6/1962 |
| DE | 4314164 | 11/1994 |

(Continued)

OTHER PUBLICATIONS

International Search Report from PCT application No. PCT/US2012/061518, dated Apr. 22, 2014, 17 pgs.

*Primary Examiner* — Thanh Lam
(74) *Attorney, Agent, or Firm* — Fletcher Yoder, P.C.

(57) ABSTRACT

A system, in certain embodiments, includes a current control brush assembly including a first electrically conductive arcuate housing section retaining a first set of electrically conductive filaments. The first set of electrically conductive filaments extends generally inward along a radial direction. The current control brush assembly also includes a second electrically conductive arcuate housing section retaining a second set of electrically conductive filaments. The second set of electrically conductive filaments extends generally inward along the radial direction. Furthermore, the current control brush assembly includes a hinge configured to facilitate rotation of the second electrically conductive arcuate housing section relative to the first electrically conductive arcuate housing section about an axis substantially perpendicular to a first axial surface of the first electrically conductive arcuate housing section.

20 Claims, 6 Drawing Sheets

(56) References Cited

FOREIGN PATENT DOCUMENTS

| | | |
|---|---|---|
| EP | 0796663 | 9/1997 |
| GB | 2121617 | 12/1983 |
| WO | 2006115600 | 11/2006 |
| WO | 2008130851 | 10/2008 |
| WO | 2009023412 | 2/2009 |

* cited by examiner

CURRENT CONTROL BRUSH ASSEMBLY

CROSS REFERENCE TO RELATED APPLICATION

This application claims priority from and the benefit of U.S. Provisional Application Ser. No. 61/552,859, entitled "CURRENT CONTROL BRUSH ASSEMBLY", filed Oct. 28, 2011, which is hereby incorporated by reference in its entirety.

BACKGROUND

The invention relates generally to a current control brush assembly and, more specifically, to a brush assembly having multiple housing sections coupled to one another by a hinge.

During operation of an electric motor, a static electrical charge may accumulate on the motor drive shaft due to friction between the rotating shaft and the surrounding air. In addition, friction between rotating objects electrically coupled to the shaft and the surrounding air may further increase the static electrical charge on the shaft. Moreover, in certain embodiments, the electric motor is driven by a variable frequency drive that may generate elevated common mode voltages. As a result, an electrical charge may be induced within the shaft, thereby further increasing the accumulated charge. If the shaft electrical charge exceeds a threshold value, the shaft may discharge to the motor housing, thereby increasing wear on motor elements (e.g., bearings, windings, etc.) and/or interfering with operation of objects coupled to the shaft.

BRIEF DESCRIPTION

A system, in certain embodiments, includes a current control brush assembly including a first electrically conductive arcuate housing section retaining a first set of electrically conductive filaments. The first set of electrically conductive filaments extends generally inward along a radial direction. The current control brush assembly also includes a second electrically conductive arcuate housing section retaining a second set of electrically conductive filaments. The second set of electrically conductive filaments extends generally inward along the radial direction. Furthermore, the current control brush assembly includes a hinge configured to facilitate rotation of the second electrically conductive arcuate housing section relative to the first electrically conductive arcuate housing section about an axis substantially perpendicular to a first axial surface of the first electrically conductive arcuate housing section.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure may substantially reduce accumulation of an electrical charge on a shaft by providing a current control brush assembly having multiple electrically conductive filaments configured to contact the shaft, and to transfer the electrical charge from the shaft to an electrically conductive housing. In certain embodiments, the current control brush assembly includes a first arcuate housing section retaining a first set of filaments, and a second arcuate housing section retaining a second set of filaments. The filaments extend radially inward toward a shaft, and are configured to transfer an electrical charge from the shaft to the electrically conductive arcuate housing sections. The current control brush assembly also includes a hinge coupled to the first and second arcuate housing sections, and configured to enable the current control brush assembly to transition between a closed position in which the first and second arcuate housing sections substantially surround the shaft, and an open position configured to facilitate disposition of the current control brush assembly about the shaft. Consequently, the current control brush assembly may be disposed about the shaft without uncoupling the shaft from the attached equipment.

In certain embodiments, the current control brush assembly includes arcuate plates coupled to the first and second arcuate housing sections, and configured to span the gaps between the sections. Because the hinge and/or the arcuate plates provide a connection between the first arcuate housing section and the second arcuate housing section, the overall stability of the current control brush ring assembly may be enhanced, as compared to configurations that include multiple housing sections that are not coupled to one another. The improved structural rigidity of the current control brush assembly may provide enhanced contact between the electrically conductive filaments and the shaft.

Figure 1:
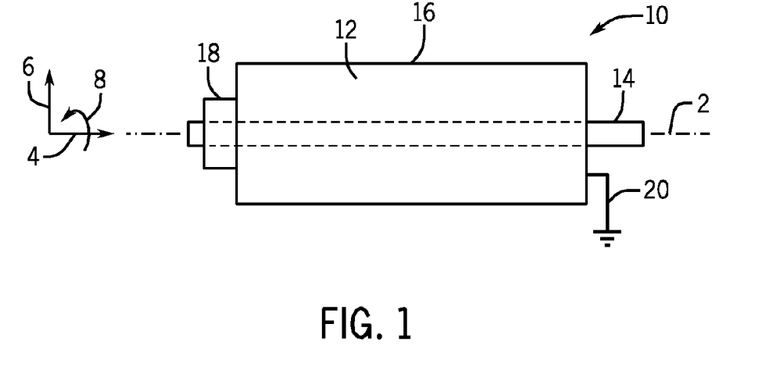
FIG. 1 is a schematic diagram of an exemplary electrical motor system including an embodiment of a current control brush assembly.

FIG. 1 is a schematic diagram of an exemplary electrical motor system 10 including an embodiment of a current control brush assembly. As illustrated, an electric motor 12 includes a shaft 14 and an electrically conductive housing 16. As will be appreciated, electrical power may be applied to the motor 12, thereby generating electromagnetic fields that induce the shaft 14 to rotate relative to the housing 16. During operation of the electric motor 12, a static electrical charge may accumulate on the shaft 14 due to friction between the shaft (and/or equipment coupled to the shaft) and the surrounding air. Consequently, the illustrated embodiment includes a current control brush assembly 18 configured to transfer an electrical charge from the shaft 14 to the electrically conductive housing 16. Because the electrically conductive housing 16 is electrically coupled to a reference potential (e.g., the Earth ground 20), the electrical charge induced by rotation of the shaft 14 is dissipated prior to substantial accumulation. As a result, the possibility of an electrical discharge between the shaft 14 and the housing 16 (e.g., through a roller bearing disposed between the shaft 14 and the housing 16) is substantially reduced or eliminated.

As discussed in detail below, the current control brush assembly 18 is configured to be disposed about the shaft 14 without uncoupling the shaft 14 from the attached equipment. For purposes of discussion, reference will be made to a rotational axis 2 of the shaft 14, an axial direction or axis 4 along the shaft 14, a radial direction or axis 6 toward or away from the shaft 14, and a circumferential direction or axis 8 around the shaft 14. In certain embodiments, the current control brush assembly 18 includes a first arcuate housing section retaining a first set of filaments, and a second arcuate housing section retaining a second set of filaments. The first and second sets of filaments are directed radially inward to facilitate contact with the shaft 14. The current control brush assembly 18 also includes a hinge coupled to the first and second arcuate housing sections. The hinge is configured to enable the current control brush assembly 18 to transition between a closed position in which the first and second arcuate housing sections form a substantially annular housing that surrounds the shaft 14, and an open position configured to facilitate disposition of the current control brush assembly 18 about the shaft 14 without disconnecting the attached equipment.

To install the current control brush assembly 18, the open brush assembly 18 is translated in the radial direction 6 until the filaments contact the shaft 14. The brush assembly 18 is then transitioned to the closed position via rotation of the first and second arcuate housing sections toward one another. The brush assembly 18 is then translated in the axial direction 4 until the brush assembly 18 contacts a faceplate of the motor housing 16. With the current control brush assembly 18 installed, an induced electrical charge on the shaft 14 transfers to the first and/or second arcuate housing sections via the electrically conductive filaments. The charge then flows from the housing sections to the ground 20 via the electrically conductive housing 16. As a result, an electrical charge induced by rotation of the shaft 14 dissipates prior to substantial accumulation, thereby substantially reducing or eliminating the possibility of an electrical discharge between the shaft 14 and the housing 16 (e.g., through a roller bearing disposed between the shaft 14 and the housing 16).

Figure 2:
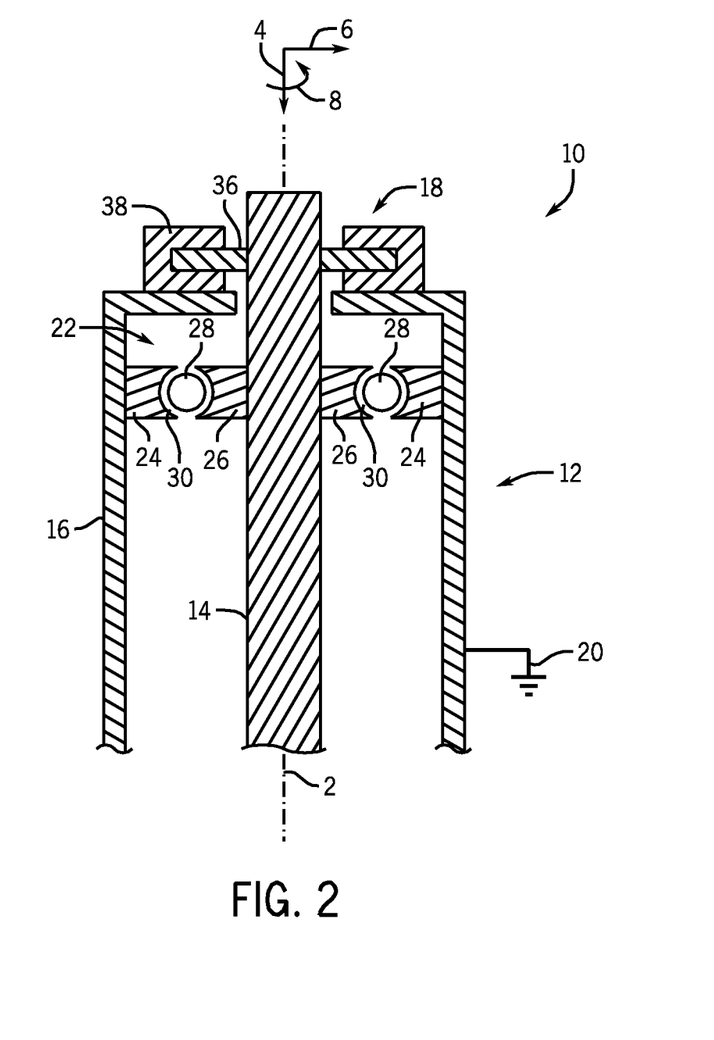
FIG. 2 is a partial cross-sectional view of the electrical motor system of FIG. 1, including an embodiment of a current control brush assembly having electrically conductive filaments configured to transfer an electrical charge from a shaft to an electrically conductive housing of the electrical motor system.

FIG. 2 is a partial cross-sectional view of the electrical motor system 10 of FIG. 1, including an embodiment of a current control brush assembly 18 having electrically conductive filaments configured to transfer an electrical charge from the shaft 14 to the electrically conductive housing 16 of the electric motor 12. In the illustrated embodiment, the electrical motor system 10 includes a roller bearing 22 configured to facilitate rotation of the shaft 14 relative to the housing 16. As illustrated, the roller bearing 22 includes an outer race 24, an inner race 26 and multiple ball bearings 28 disposed between the races. The outer race 24 is coupled to the housing 16, and the inner race 24 is coupled to the shaft (e.g., via an interference fit). As will be appreciated, bearing grease 30 may be distributed throughout the roller bearing 22. The bearing grease 30 facilitates rotation of the ball bearings 28, thereby enabling the inner race 26 to rotate relative to the outer race 24, and facilitating rotation of the shaft 14.

In the illustrated embodiment, the shaft 14 extends through the housing 16 and into the current control brush assembly 18. The current control brush assembly 18 includes multiple electrically conductive filaments 36 configured to contact the shaft 14 to facilitate transfer of an electrical charge from the shaft 14 to an electrically conductive annular housing 38 of the current control brush assembly 18. As illustrated, the brush assembly housing 38 is electrically coupled to the motor housing 16, and the motor housing 16 is electrically coupled to the Earth ground 20, such that an electrical path is established between the electrically conductive filaments 36 and the ground 20. Consequently, an induced electrical charge on the shaft 14 transfers to the ground 20 via the electrically conductive filaments 36. As a result, an electrical charge induced by rotation of the shaft 14 dissipates prior to substantial accumulation, thereby substantially reducing or eliminating the possibility of an electrical discharge between the shaft 14 and the housing 16 (e.g., through the roller bearing 22).

In the illustrated embodiment, the annular housing 38 of the current control brush assembly 18 includes a first electrically conductive arcuate housing section, and a second electrically conductive arcuate housing section. The arcuate housing sections are coupled to one another by a hinge that facilitates rotation of the second arcuate housing section relative to the first arcuate housing section. Consequently, the current control brush assembly 18 may be transitioned between an open position configured to facilitate disposition of the current control brush assembly 18 about the shaft 14, and a closed position in which the first and second arcuate housing sections substantially surround the circumference of the shaft 14. For example, while the current control brush assembly 18 is in the open position, the brush assembly 18 may be disposed about the shaft 14 without uncoupling attached equipment from the shaft 14. The current control brush assembly 18 may then be transitioned to the closed position such that the brush assembly 18 substantially surrounds the shaft 14. Such a configuration may substantially reduce the costs associated with installing the current control brush assembly 18, as compared to continuous ring assemblies that are installed onto the shaft 14 after removing the attached equipment.

Figure 3:
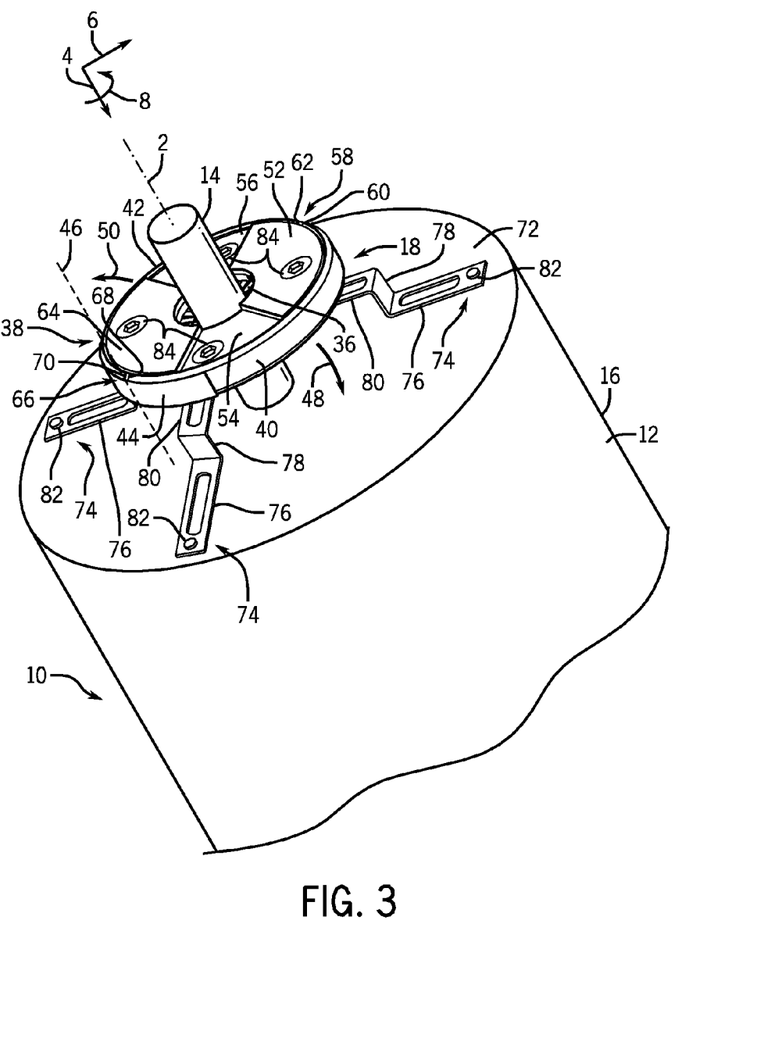
FIG. 3 is a perspective view of an embodiment of a current control brush assembly having two housing sections coupled to one another by a hinge.

FIG. 3 is a perspective view of an embodiment of a current control brush assembly 18 having two housing sections coupled to one another by a hinge. As illustrated, the current control brush assembly 18 includes a first electrically conductive arcuate housing section 40, and a second electrically conductive arcuate housing section 42. Each arcuate housing section is configured to retain a respective set of electrically conductive filaments 36. As previously discussed, the electrically conductive filaments 36 extend generally inward along the radial direction 6. In certain embodiments, each filament 36 is a fine, hair-like structure (e.g., micro conductive fiber)

made from carbon fiber, stainless steel, conductive plastics such as acrylic or nylon fibers, or any other conductive fiber-type filament. In addition, each filament has a diameter less than about 150 microns. For example, certain filaments have a diameter within a range of about 5 microns to about 100 microns. Due to the flexibility of the micro conductive fibers, the filaments will generally maintain contact with the shaft 14 during high-speed shaft rotation. In addition, contact between the micro conductive fibers and the shaft produces less rotational resistance than larger diameter/stiffer fibers. It should be appreciated, that the length, diameter and material of each filament 36 may be particularly selected to effectively transfer an electrical charge from the shaft 14 to the brush assembly 18, while facilitating shaft rotation.

In the illustrated embodiment, the first and second arcuate housing sections 40 and 42 are formed from a conductive material, such as aluminum, copper, brass, or steel, among others. As discussed in detail below, each arcuate housing section includes a support having a base member and an outer band extending about a perimeter of the base member. Each arcuate housing section also includes an arcuate plate secured to the support. In certain embodiments, the arcuate plate is configured to retain the electrically conductive filaments 36 by compressing the filaments 36 against the support. In alternative embodiments, the electrically conductive filaments 36 are secured to the arcuate housing sections 40 and 42 by a conductive adhesive. Because the filaments 36 are electrically coupled to the arcuate housing sections 40 and 42, contact between the filaments 36 and a circumference of the shaft 14 establishes an electrical connection between the shaft 14 and the housing sections 40 and 42. Furthermore, because the arcuate housing sections 40 and 42 are electrically coupled to the motor housing 16, and the motor housing 16 is electrically coupled to the Earth ground 20, an electrical path is established between the shaft 14 and the ground 20. As a result, an electrical charge induced by rotation of the shaft 14 is dissipated prior to substantial accumulation, thereby substantially reducing or eliminating the possibility of an electrical discharge between the shaft 14 and the housing 16 (e.g., through a roller bearing disposed between the shaft 14 and the housing 16).

In the illustrated embodiment, the current control brush assembly 18 includes a hinge 44 configured to facilitate rotation of the second electrically conductive arcuate housing section 42 relative to the first electrically conductive arcuate housing section 40 about an axis 46 substantially parallel to the rotational axis 2 of the shaft 14. The hinge 44 is configured to enable the current control brush assembly 18 to transition between the illustrated closed position in which the first and second arcuate housing sections 40 and 42 substantially surround the circumference of the shaft 14, and an open position configured to facilitate installation and removal of the brush assembly 18. For example, to remove the current control brush assembly 18 from the motor housing 16, the housing sections 40 and 42 may be uncoupled from the housing 16, the first arcuate housing section 40 may be rotated in the direction 48 about the axis 46, and the second arcuate housing section 42 may be rotated in the direction 50 about the axis 46. The current control brush assembly 18 may then be removed from the shaft 14 without uncoupling any equipment attached to the shaft. Such a configuration may substantially reduce the costs associated with removing the current control brush assembly 18, as compared to continuous ring assemblies that are attached to the shaft 14 after removing the attached equipment.

As discussed in detail below, the hinge 44 includes a flexible strip extending from the first arcuate housing section 40 to the second arcuate housing section 42. The flexible strip forms a living hinge that enables the housing sections to rotate relative to one another. However, it should be appreciated that alternative embodiments may include other hinge assemblies configured to facilitate rotation of the housing sections. For example, certain hinges may include a pin extending through the housing sections, thereby enabling the housing sections to rotate relative to one another. Alternatively, the hinge may be a barrel hinge having a self-contained external pivot, or any other suitable hinge configuration. As discussed in detail below, because the hinge 44 provides a connection between the first arcuate housing section 40 and the second arcuate housing section 42, the overall stability of the current control brush assembly 18 may be enhanced, as compared to configurations that include multiple housing sections that are not coupled to one another. The improved stability of the current control brush assembly 18 may provide enhanced contact between the electrically conductive filaments 36 and the shaft 14.

In the illustrated embodiment, the current control brush assembly 18 includes a locking assembly/arcuate plate 52 configured to selectively block rotation of the second arcuate housing sections 42 relative to the first arcuate housing section 40 while the brush assembly 18 is in the closed position. As illustrated, the arcuate plate 52 is secured to an axial surface 54 of the first arcuate housing section 40, and to an axial surface 56 of the second arcuate housing section 42. Consequently, the arcuate plate 52 blocks movement of the first arcuate housing section 40 in the direction 48, and blocks movement of the second arcuate housing section 42 in the direction 50. As discussed in detail below, the arcuate plate 52 may be secured to the axial surfaces 54 and 56 via an adhesive layer. For example, prior to installation, the arcuate plate 52 may be secured to the axial surface 54 of the first arcuate housing section 40 while the current control brush assembly 18 is in the open position. The current control brush assembly 18 may then be disposed about the shaft 14, and transitioned to the closed position. As the arcuate plate 52 contacts the axial surface 56 of the second arcuate housing section, an adhesive layer coupled to the arcuate plate 52 and/or the axial surface 56 may establish an adhesive bond between the arcuate plate 52 and the second arcuate housing section 42, thereby blocking rotation of the arcuate housing sections relative to one another. As a result, the arcuate housing sections 40 and 42 form a substantially annular housing configured to substantially surround the circumference of the shaft 14.

As illustrated, when the current control brush assembly 18 is coupled to the motor housing 16, a gap 58 is formed between a circumferential end 60 of the first arcuate housing section 40 and a circumferential end 62 of the second arcuate housing section. As will be appreciated, the size of the gap 58 may be dependent upon the geometry of the arcuate housing sections 40 and 42, the orientation of the arcuate housing sections 40 and 42 relative to the motor housing 16, and/or other factors (e.g., fastener alignment, fastener orientation, etc.) that may affect alignment of the arcuate housing sections 40 and 42. Because the arcuate plate 52 extends across the gap 58 between the first arcuate housing section 40 and the second arcuate housing section 42, the structural rigidity of the current control brush assembly 18 may be enhanced, as compared to configurations that employ multiple housing sections that are not coupled to one another. Because the hinge 44 and the arcuate plate 52 provide improved structural rigidity, the overall stability of the current control brush assembly 18 may be enhanced, thereby providing improved contact between the electrically conductive filaments 36 and the shaft 14.

While the illustrated locking assembly includes an arcuate plate 52 extending from the first arcuate housing section 40 to the second arcuate housing section 42, it should be appreciated that alternative embodiments may include other locking assemblies. For example, in certain embodiments, the locking assembly may include a latch that couples the arcuate housing section to one another. Alternatively, the locking assembly may include a pin that extends through the first and second housing sections 40 and 42 to selectively secure the housing sections to one another. As will be appreciated, each locking assembly may enhance the structural rigidity of the current control brush assembly 18. However, the degree of rigidity enhancement may be at least partially dependent on the particular locking mechanism configuration.

In the illustrated embodiment, the current control brush assembly 18 includes a second arcuate plate 64 positioned adjacent to the hinge 44, and configured to enhance the structural rigidity of the current control brush assembly 18. As illustrated, the arcuate plate 64 is secured to the axial surface 54 of the first arcuate housing section 40, and to the axial surface 56 of the second arcuate housing section 42 (e.g., via adhesive connections). For example, prior to installation, the arcuate plate 64 may be secured to the axial surface 56 of the second arcuate housing section 42 while the current control brush assembly 18 is in the open position. The current control brush assembly 18 may then be disposed about the shaft 14, and transitioned to the closed position. As the arcuate plate 64 contacts the axial surface 54 of the first arcuate housing section 40, an adhesive layer coupled to the arcuate plate 64 and/or the axial surface 54 may establish an adhesive bond between the arcuate plate 64 and the first arcuate housing section 40.

As illustrated, when the current control brush assembly 18 is coupled to the motor housing 16, a gap 66 is formed between a circumferential end 68 of the first arcuate housing section 40 and a circumferential end 70 of the second arcuate housing section 42. As previously discussed, the size of the gap 66 may be dependent upon the geometry of the arcuate housing sections 40 and 42, the orientation of the arcuate housing sections 40 and 42 relative to the motor housing 16, and/or other factors (e.g., fastener alignment, fastener orientation, etc.) that may affect alignment of the arcuate housing sections 40 and 42. Because the arcuate plate 64 extends across the gap 66 between the first arcuate housing section 40 and the second arcuate housing section 42, the structural rigidity of the current control brush assembly 18 may be enhanced, as compared to configurations that employ multiple housing sections that are not coupled to one another. Because the hinge 44, the first arcuate plate 52, and the second arcuate plate 64 provide improved structural rigidity, the overall stability of the current control brush assembly 18 may be enhanced, thereby providing improved contact between the electrically conductive filaments 36 and the shaft 14.

In the illustrated embodiment, the current control brush assembly 18 is electrically and physically coupled to an electrically conductive faceplate 72 of the motor housing 16. In this configuration, an induced electrical charge on the shaft 14 transfers to the first and second electrically conductive housing sections 40 and 42 via the electrically conductive filaments 36. Because the current control brush assembly 18 is electrically coupled to the electrically conductive motor housing 16, and the motor housing 16 is electrically coupled to a reference potential (e.g., the Earth ground 20), the electrical charge induced by rotation of the shaft 14 is dissipated prior to substantial accumulation. As a result, the possibility of an electrical discharge between the shaft 14 and the housing 16 (e.g., through a roller bearing disposed between the shaft 14 and the housing 16) is substantially reduced or eliminated. While the current control brush assembly 18 is electrically and physically coupled to an electrically conductive faceplate 72 in the illustrated embodiment, it should be appreciated that, in alternative embodiments, the current control brush assembly may be electrically and/or physically coupled to other elements of the electric motor (e.g., a grounded cover).

As illustrated, the current control brush assembly 18 includes mounting brackets 74 spaced about the brush assembly 18 along the circumferential direction 8. The mounting brackets 74 are configured to secure the arcuate housing sections 40 and 42 to the surface of the faceplate 72. While the illustrated embodiment includes four mounting brackets 74, it should be appreciated that alternative embodiments may include more or fewer mounting brackets 74 (e.g., 1, 2, 3, 4, 5, 6, 7, 8, or more). As illustrated, each mounting bracket 74 includes a base 76, a riser 78 extending upwardly from the base 76, and a distal end 80 extending inwardly from the riser 78. In the illustrated embodiment, the base 76 extends along the surface of the faceplate 72 in the radial direction 6, the riser 78 extends upwardly along the axial direction 4, and the distal end 80 extends inwardly along the radial direction 6. The base 76 of each mounting bracket 74 is secured to the faceplate 72 by a first fastener 82, and the distal end 80 is secured to the respective housing section by a second fastener 84. In the illustrated embodiment, the mounting brackets 74 and fasteners 82 and 84 are electrically conductive, thereby facilitating current flow from the first and second housing sections 40 and 42 to the electrically conductive faceplate 72.

While each illustrated bracket 74 includes a riser 78 configured to space the arcuate housing sections 40 and 42 from the surface of the faceplate 72, it should be appreciated that alternative embodiments may employ brackets configured to couple the arcuate housing sections directly to the surface of the faceplate. For example, in certain embodiments, the distal end of each bracket may be coupled to an upper surface of a respective housing section, thereby securing the housing sections to the surface of the faceplate. In further embodiments, substantially flat brackets (e.g., brackets having no risers) may be employed to secure the housing sections proximate to the surface of the faceplate.

In addition, while electrically conductive brackets 74 are employed in the illustrated embodiment to transfer electrical current from the housing sections 40 and 42 to the electrically conductive faceplate 72, it should be appreciated that non-conductive brackets may be employed in alternative embodiments. For example, in certain embodiments, an electrical conductor may extend from each housing section to the faceplate to transfer electrical current from the current control brush assembly to the faceplate. In further embodiments, one or more electrical conductors may be employed to transfer electrical current from the current control brush assembly directly to the Earth ground, and/or to an electrically conductive object electrically coupled to the Earth ground (e.g., shroud, shielding, etc.), thereby bypassing the motor housing 16.

While the illustrated current control brush assembly 18 includes two electrically conductive arcuate housing sections 40 and 42, it should be appreciated that alternative embodiments may include additional arcuate housing sections (e.g., 3, 4, 5, 6, or more). For example, in certain embodiments, the current control brush assembly 18 may include three housing sections that extend about the circumference of the shaft. In such embodiments, three gaps are formed between the respective arcuate housing sections. Consequently, a first hinge may extend between the first housing section and the second housing section, and a second hinge may extend between the second housing section and the third housing section. Consequently, with the current control brush assembly in the open position, the brush assembly may be disposed about the shaft, and transitioned to the closed position. A locking mechanism may then secure the third arcuate housing section to the first arcuate housing section, thereby forming a substantially annular housing having enhanced stability, as compared to brush assemblies having multiple housing sections that are not coupled to one another.

Figure 4:
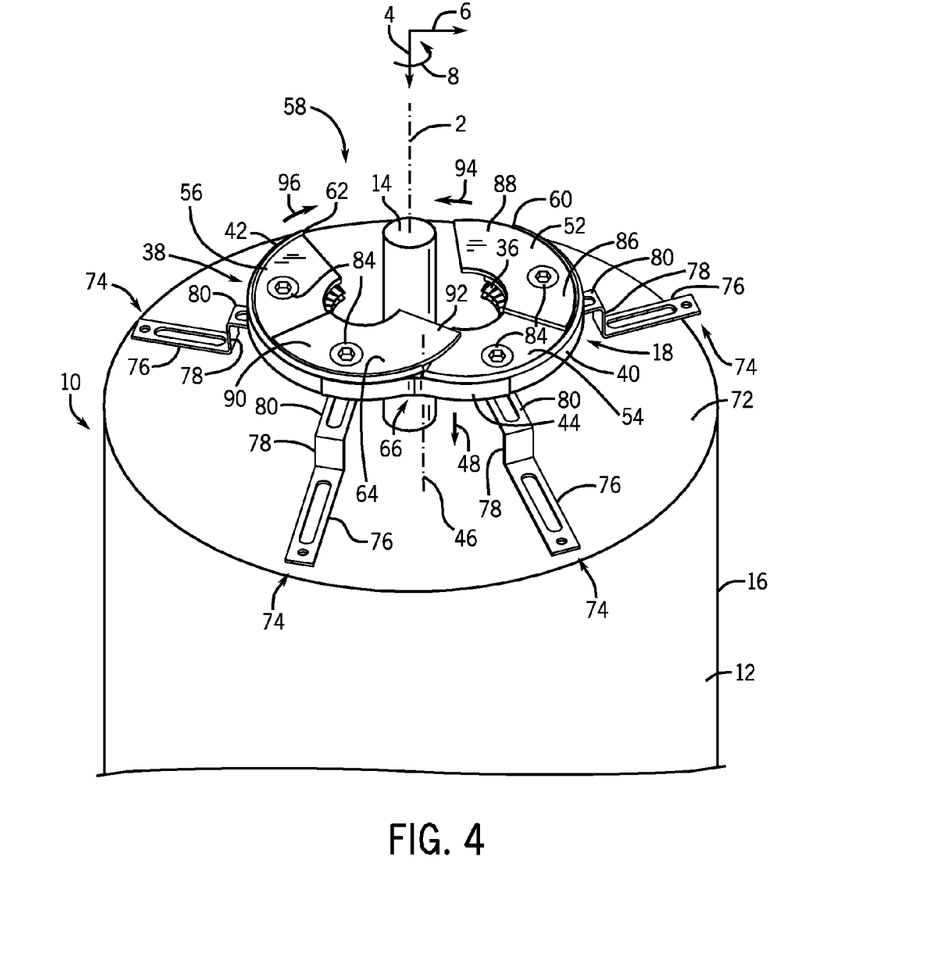
FIG. 4 is a perspective view of the current control brush assembly of FIG. 3 in an open position prior to installation.

FIG. 4 is a perspective view of the current control brush assembly 18 of FIG. 3 in an open position prior to installation. As illustrated, the gap 58 between the first and second arcuate housing sections 40 and 42 is sufficient to enable the current control brush assembly 18 to be disposed about the shaft 14. In the illustrated embodiment, a first portion 86 of the first arcuate plate 52 is coupled to the axial surface 54 of the first arcuate housing section 40 (e.g., via an adhesive connection) prior to installation of the brush assembly 18. The first arcuate plate 52 also includes a second portion 88 configured to couple to the axial surface 56 of the second arcuate housing section 42 during the installation process, thereby blocking movement of the arcuate housing section 40 and 42 relative to one another. Similarly, a first portion 90 of the second arcuate plate 64 is coupled to the axial surface 56 of the second arcuate housing section 42 (e.g., via an adhesive connection) prior to installation of the brush assembly 18. The second arcuate plate 64 also includes a second portion 92 configured to couple to the axial surface 54 of the first arcuate housing section 40, thereby enhancing the structural rigidity of the current control brush assembly 18.

During installation, the current control brush assembly 18 is disposed about the shaft 14 while in the illustrated open position. Next, the first arcuate housing section 40 is rotated in the direction 94 about the hinge axis 46, and/or the second arcuate housing section 42 is rotated in the direction 96 about the hinge axis 46. Due to the adhesive layer applied to the second portion 88 of the first arcuate plate 52, the arcuate plate 52 bonds to the axial surface 56 of the second arcuate housing section 42, thereby blocking rotation of the first and second arcuate housing sections relative to one another. Similarly, due to the adhesive layer applied to the second portion 92 of the second arcuate plate 64, the arcuate plate 64 bonds to the axial surface 54 of the first arcuate housing section 40 upon contact, thereby enhancing the overall stability of the current control brush assembly 18. Once a substantially annular housing has been formed, the current control brush assembly 18 is translated in the axial direction 4 until the mounting brackets 74 contact the faceplate 72 of the motor housing 16. The current control brush assembly 18 may be rotated in the circumferential direction 8 until an opening in the base 76 of each mounting bracket 74 aligns with a corresponding receptacle within the faceplate 72. Finally, fasteners 82 are installed to secure the mounting brackets 74 to the faceplate 72, thereby physically and electrically coupling the current control brush assembly 18 to the motor housing 16.

While mounting brackets 74 are employed in the illustrated embodiment, it should be appreciated that other mounting techniques configured to couple the current control brush assembly 18 to the surface of the faceplate 72 may be employed in alternative embodiments. For example, the current control brush assembly 18 may be directly bonded to the surface of the faceplate 72 (e.g., via an electrically conductive adhesive). Furthermore, while the arcuate plates 52 and 64 are bonded to the respective axial surfaces 54 and 56 in the illustrated embodiment, it should be appreciated that alternative embodiments may utilize other mounting techniques to secure the arcuate plates 52 and 64 to the first and second arcuate housing sections 40 and 42. For example, in certain embodiments, each arcuate plate may be secured to a respect axial surface via one or more fasteners and/or a welded connection.

Figure 5:
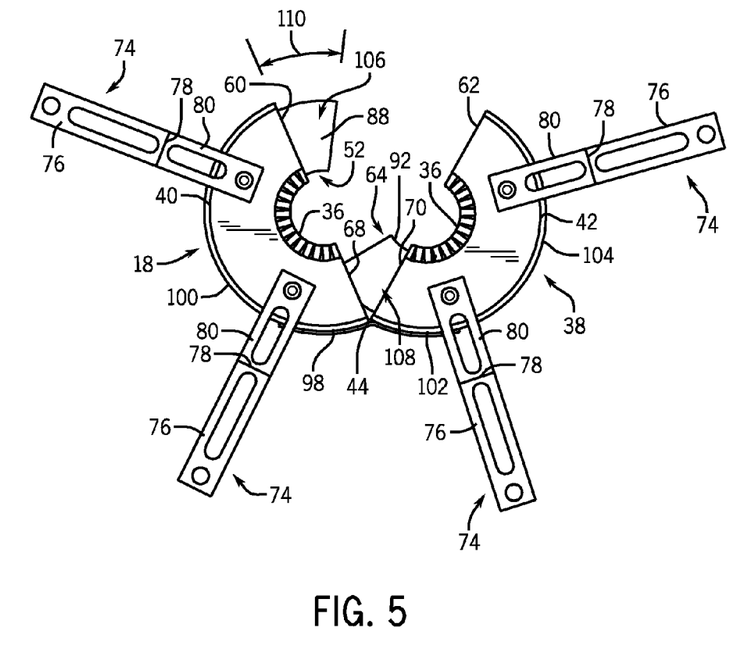
FIG. 5 is a bottom view of the current control brush assembly of FIG. 3 in an open position.

FIG. 5 is a bottom view of the current control brush assembly 18 of FIG. 3 in an open position. As previously discussed, the hinge 44 extends between the first arcuate housing section 40 and the second arcuate housing section 42 to facilitate rotation of the housing sections relative to one another. In the illustrated embodiment, the hinge 44 includes a flexible strip having a first end 98 coupled to an outer radial surface 100 of the first arcuate housing section, and a second end 102 coupled to an outer radial surface 104 of the second arcuate housing section 42. In this configuration, the flexible strip forms a living hinge that enables the current control brush assembly 18 to transition between a closed position in which the first and second arcuate housing sections 40 and 42 form a substantially annular housing configured to surround the circumference of the shaft 14, and an open position configured to facilitate disposition of the current control brush assembly 18 about the shaft 14.

In the illustrated embodiment, a first adhesive layer 106 is applied to the second portion 88 of the first arcuate plate 52, and a second adhesive layer 108 is applied to the second portion 92 of the second arcuate plate 64. In certain embodiments, the adhesive layer includes a liquid resin that bonds to the respective axial surface upon contact. Alternatively, the adhesive layer may be an element of double-sided tape, such as 3M™ VHB™ Tape manufactured by 3M of St. Paul, Minn. For example, double-sided tape may be applied to the entire axial surface of the first and second arcuate plates 52 and 64. The first portion 86 of the first plate 52 is then bonded to the axial surface 54 of the first arcuate housing section 40 by the double-sided tape, and the first portion 90 of the second plate 64 is bonded to the axial surface 56 of the second arcuate housing section 42 by the double-sided tape. As a result of this configuration, the double-sided tape provides the adhesive layer 106 on the second portion 88 of the first arcuate plate 52, and provides the adhesive layer 108 on the second portion 92 of the second arcuate plate 64. In the illustrated embodiment, the second portions 88 and 92 of the respective arcuate plates 52 and 64 extend along the circumferential direction 8 through an angle 110 of about 30 degrees. However, it should be appreciated that the length of the second portions 88 and 92 may be longer or shorter in alternative embodiments.

Once the current control brush assembly 18 is installed, the first arcuate plate 52 extends across the gap 58 between the first arcuate housing section 40 and the second arcuate housing section 42. In addition, the hinge 44 and the second arcuate plate 64 extend across the gap 66 between the second arcuate housing section 42 and the first arcuate housing section 40. As a result, the structural rigidity of the current control brush assembly 18 may be enhanced, as compared to configurations that employ multiple housing sections that are not coupled to one another. Because the hinge 44 and the arcuate plates 52 and 66 provide improved structural rigidity, the overall stability of the current control brush assembly 18 may be enhanced, thereby providing improved contact between the electrically conductive filaments 36 and the shaft 14.

Figure 6:
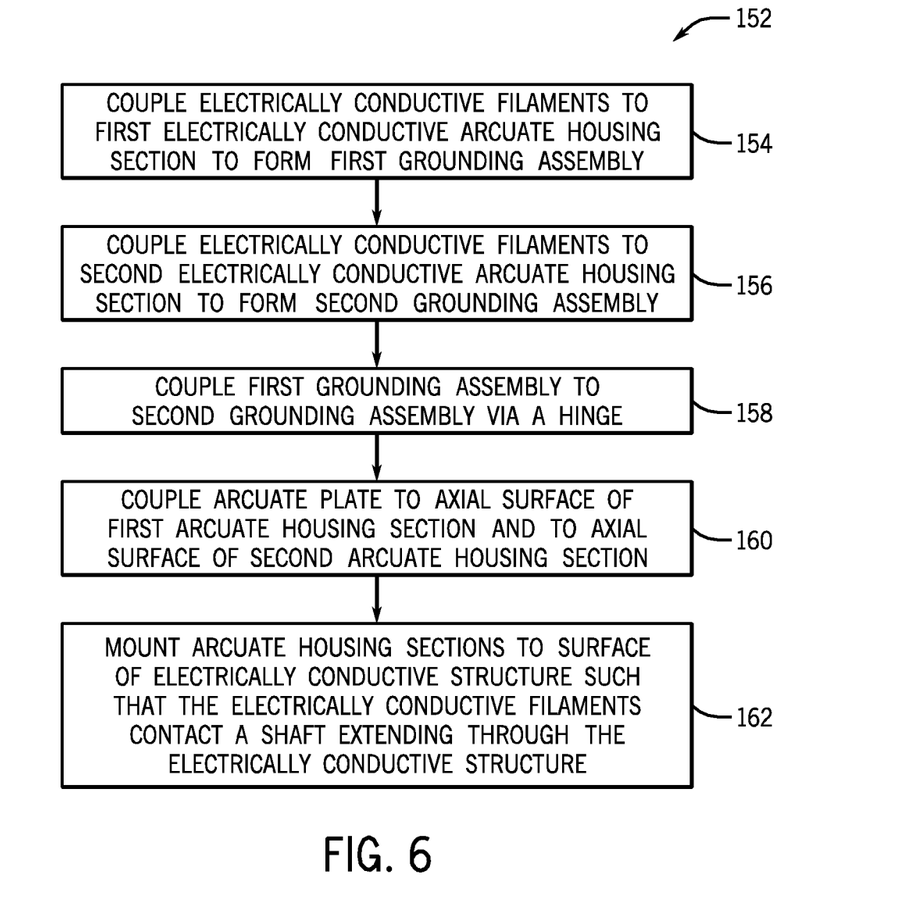
FIG. 6 is a flow diagram of an embodiment of a method of manufacturing a current control brush assembly.

FIG. 6 is a flow diagram of an embodiment of a method 152 of manufacturing a current control brush assembly. First, as represented by block 154, electrically conductive filaments are coupled to the first electrically conductive arcuate housing section to form a first grounding assembly. As previously discussed, the filaments may be coupled to the housing section by compression between an arcuate plate and a support. Next, electrically conductive filaments are coupled to the second electrically conductive arcuate housing section to form a second grounding assembly, as represented by block 156. The first and second grounding assemblies are then coupled to one another via a hinge, as represented by block 158. As previously discussed, the hinge is configured to enable the current control brush assembly to transition between a closed position in which the first and second electrically conductive arcuate housing sections form a substantially annular housing configured to surround a circumference of the shaft, and an open position configured to facilitate disposition of the current control brush assembly about the shaft.

An arcuate plate is then coupled to the axial surface of the first arcuate housing section, and to the axial surface of the second arcuate housing section, as represented by block 160. As previously discussed, the arcuate plate is configured to selectively block rotation of the second arcuate housing section relative to the first arcuate housing section while the brush assembly is in the closed position. As a result, the arcuate housing sections form a substantially annular housing configured to surround the circumference of the shaft. Finally, as represented by block 162, the arcuate housing sections are mounted to a surface of an electrically conductive structure such that the electrically conductive filaments contact a shaft extending through the electrically conductive structure. By way of example, the current control brush assembly may be disposed about the shaft while the brush assembly is in the open position. The brush assembly may then be transitioned to the closed position, thereby establishing contact between the arcuate plate and the axial surfaces of the housing sections, and forming a substantially annular housing. The substantially annular housing may be coupled to the electrically conductive faceplate to establish an electrical path from the shaft to the faceplate via the electrically conductive filaments and the electrically conductive housing sections. In this manner, the current control brush assembly may be disposed about a shaft without uncoupling attached equipment, thereby substantially reducing the costs associated with installing the current control brush assembly.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
  a current control brush assembly, comprising:
    a first electrically conductive arcuate housing section retaining a first plurality of electrically conductive filaments, wherein the first plurality of electrically conductive filaments extends generally inward along a radial direction;
    a second electrically conductive arcuate housing section retaining a second plurality of electrically conductive filaments, wherein the second plurality of electrically conductive filaments extends generally inward along the radial direction; and
    a hinge configured to facilitate rotation of the second electrically conductive arcuate housing section relative to the first electrically conductive arcuate housing section about an axis substantially perpendicular to a first axial surface of the first electrically conductive arcuate housing section.

2. The system of claim 1, wherein the hinge comprises a flexible strip coupled to a first outer radial surface of the first electrically conductive arcuate housing section, and to a second outer radial surface of the second electrically conductive arcuate housing section.

3. The system of claim 2, wherein the flexible strip is coupled to the first outer radial surface via a first adhesive layer, and the flexible strip is coupled to the second outer radial surface via a second adhesive layer.

4. The system of claim 1, wherein the hinge is positioned adjacent to a first circumferential end of the first electrically conductive arcuate housing section, and adjacent to a second circumferential end of the second electrically conductive arcuate housing section, and wherein the current control brush assembly comprises a locking assembly configured to secure a third circumferential end of the first electrically conductive arcuate housing section to a fourth circumferential end of the second electrically conductive arcuate housing section.

5. The system of claim 4, wherein the locking assembly comprises a first arcuate plate configured to couple to the first axial surface of the first electrically conductive arcuate housing section adjacent to the first circumferential end, and to a second axial surface of the second electrically conductive arcuate housing section adjacent to the second circumferential end.

6. The system of claim 5, wherein the first arcuate plate is configured to couple to the first axial surface via a first adhesive layer, and the first arcuate plate is configured to couple to the second axial surface via a second adhesive layer.

7. The system of claim 5, wherein the current control brush assembly comprises a second arcuate plate configured to couple to the first axial surface adjacent to the third circumferential end, and to the second axial surface adjacent to the fourth circumferential end.

8. The system of claim 1, wherein the first plurality of electrically conductive filaments extends radially inward toward a shaft, the first plurality of electrically conductive filaments is configured to transfer a first electrical charge from the shaft to the first electrically conductive arcuate housing section, the second plurality of electrically conductive filaments extends radially inward toward the shaft, and the second plurality of electrically conductive filaments is configured to transfer a second electrical charge from the shaft to the second electrically conductive arcuate housing section.

9. The system of claim 8, wherein the first and second electrically conductive arcuate housing sections are configured to mount to a surface of an electrically conductive structure such that at least a portion of the first and second pluralities of electrically conductive filaments contacts the shaft extending through the electrically conductive structure.

10. The system of claim 9, wherein the electrically conductive structure comprises a faceplate of an electric motor.

11. A system comprising:
  a current control brush assembly, comprising:
    a first arcuate housing section retaining a first plurality of filaments, wherein the first plurality of filaments extends generally inward along a radial direction;
    a second arcuate housing section retaining a second plurality of filaments, wherein the second plurality of filaments extends generally inward along the radial direction; and
    a hinge coupled to the first and second arcuate housing sections, wherein the hinge is configured to enable the current control brush assembly to transition between a closed position in which the first and second arcuate housing sections form a substantially annular housing configured to surround a circumference of a shaft, and an open position configured to facilitate disposition of the current control brush assembly about the shaft, wherein the first arcuate housing section, the second arcuate housing section, the first plurality of filaments, and the second plurality of filaments are electrically conductive.

12. The system of claim 11, wherein the hinge is positioned adjacent to a first circumferential end of the first arcuate housing section, and adjacent to a second circumferential end of the second arcuate housing section, and wherein the current control brush assembly comprises a locking assembly configured to secure a third circumferential end of the first arcuate housing section to a fourth circumferential end of the second arcuate housing section.

13. The system of claim 11, wherein the hinge comprises a flexible strip coupled to a first outer radial surface of the first arcuate housing section, and to a second outer radial surface of the second arcuate housing section.

14. The system of claim 13, wherein the flexible strip is coupled to the first outer radial surface via a first adhesive layer, and the flexible strip is coupled to the second outer radial surface via a second adhesive layer.

15. The system of claim 11, wherein at least one of the first plurality of filaments is made from a material comprising micro conductive fiber, and at least one of the second plurality of filaments is made from a material comprising micro conductive fiber.

16. A method of manufacturing a current control brush assembly, comprising:
  forming a first grounding assembly by coupling a first plurality of electrically conductive filaments to a first electrically conductive arcuate housing section such that the first plurality of electrically conductive filaments extends generally inward along a radial direction;
  forming a second grounding assembly by coupling a second plurality of electrically conductive filaments to a second electrically conductive arcuate housing section such that the second plurality of electrically conductive filaments extends generally inward along the radial direction; and
  coupling the first grounding assembly to the second grounding assembly via a hinge configured to enable the current control brush assembly to transition between a closed position in which the first and second electrically conductive arcuate housing sections form a substantially annular housing configured to surround a circumference of a shaft, and an open position configured to facilitate disposition of the current control brush assembly about the shaft.

17. The method of claim 16, wherein the hinge comprises a flexible strip, and wherein coupling the first grounding assembly to the second grounding assembly comprises coupling the flexible strip to a first outer radial surface of the first electrically conductive arcuate housing section, and coupling the flexible strip to a second outer radial surface of the second electrically conductive arcuate housing section.

18. The method of claim 16, comprising coupling an arcuate plate to a first axial surface of the first electrically conductive arcuate housing section, and coupling the arcuate plate to a second axial surface of the second electrically conductive arcuate housing section.

19. The method of claim 18, wherein the arcuate plate is configured to couple to the first and second axial surfaces via an adhesive layer.

20. The method of claim 16, comprising mounting the first and second electrically conductive arcuate housing sections to a surface of an electrically conductive structure such that at least a portion of the first and second plurality of electrically conductive filaments contacts the shaft extending through the electrically conductive structure.

* * * * *